(12) United States Patent
Matsushita

(10) Patent No.: US 11,820,300 B2
(45) Date of Patent: Nov. 21, 2023

(54) IMAGE GENERATION DEVICE, CAMERA, DISPLAY SYSTEM, AND VEHICLE

(71) Applicant: Panasonic Intellectual Property Management Co., Ltd., Osaka (JP)

(72) Inventor: Masatoshi Matsushita, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 135 days.

(21) Appl. No.: 17/479,627

(22) Filed: Sep. 20, 2021

(65) Prior Publication Data
US 2022/0001813 A1 Jan. 6, 2022

Related U.S. Application Data

(63) Continuation of application No. PCT/JP2019/048100, filed on Dec. 9, 2019.

(30) Foreign Application Priority Data

Mar. 25, 2019 (JP) .................................. 2019-056211

(51) Int. Cl.
*B60R 11/04* (2006.01)
*B60R 1/00* (2022.01)
*B60W 30/085* (2012.01)

(52) U.S. Cl.
CPC ................. *B60R 11/04* (2013.01); *B60R 1/00* (2013.01); *B60W 30/085* (2013.01);
(Continued)

(58) Field of Classification Search
None
See application file for complete search history.

(56) References Cited

U.S. PATENT DOCUMENTS

| 2009/0303024 | A1 | 12/2009 | Asari | |
| 2012/0296523 | A1* | 11/2012 | Ikeda | B62D 15/0275 |
| | | | | 348/148 |
| 2020/0302657 | A1* | 9/2020 | Shimazu | G06T 11/001 |

FOREIGN PATENT DOCUMENTS

| JP | 2005-132170 | 5/2005 |
| JP | 2007-043530 | 2/2007 |

(Continued)

OTHER PUBLICATIONS

English language translation of Notice of the Reasons for Rejection from Japan Patent Office (JPO) in Japanese Patent Appl. No. 2019-056211, dated Jul. 26, 2022.

(Continued)

*Primary Examiner* — Rebecca A Volentine
(74) *Attorney, Agent, or Firm* — Greenblum & Bernstein, P.L.C.

(57) ABSTRACT

This image generation device is provided with: an image acquisition unit that acquires a rear-side image of the rear side of a vehicle; and an image generation unit. When the rear-side image includes an overlapped portion where an image region, in which an auxiliary line for assisting in the backward driving of the vehicle is overlaid, overlaps an image region in which a specific target is positioned, the image generation unit generates, in at least the overlapped portion, an image in which the auxiliary line is not overlaid or is overlaid in a semi-transparent state; and when the rear-side image does not include the overlapped portion, the image generation unit generates an image in which the auxiliary line is overlaid on the rear-side image.

10 Claims, 10 Drawing Sheets

(52) U.S. Cl.
CPC . *B60R 2300/304* (2013.01); *B60R 2300/8066* (2013.01); *B60W 2400/00* (2013.01); *B60W 2420/42* (2013.01)

(56) References Cited

FOREIGN PATENT DOCUMENTS

| JP | 2010-016805 | 1/2010 |
|----|-------------|--------|
| JP | 2010-136289 | 6/2010 |
| JP | 2012-147285 | 8/2012 |

OTHER PUBLICATIONS

International Search Report (ISR) from International Searching Authority (Japan Patent Office) in International Pat. Appl. No. PCT/JP2019/048100, dated Feb. 10, 2020, together with an English language translation.

English language translation of Office Action issued by the China National Intellectual Property Administration (CNIPA) in Chinese Patent Application No. 201980094556.2, dated Jul. 28, 2023.

\* cited by examiner

IMAGE GENERATION DEVICE, CAMERA, DISPLAY SYSTEM, AND VEHICLE

TECHNICAL FIELD

The present disclosure relates to an image generation apparatus, a camera, a display system, and a vehicle.

RELATED ART

A back view monitor device is a device for displaying, on a monitor inside a vehicle, an image captured by a camera installed in the rear of the vehicle. Some back view monitor devices are provided with a driving assistance function for displaying an image of a rear view from the vehicle on which an auxiliary line representing the traveling direction of the vehicle during reverse driving of the vehicle is superimposed, as disclosed in Patent Literature (hereinafter referred to as "PTL") 1.

CITATION LIST

Patent Literature

PTL 1
Japanese Patent Application Laid-Open No. 2012-147285

SUMMARY

An image generation apparatus according to the present disclosure includes: an image obtainer that obtains a rear-view image of a rear view from a vehicle; and an image generator that, when the rear-view image includes an overlapping portion between an image region in which an auxiliary line for assisting reverse driving of the vehicle is superimposed and an image region in which a specific object is located, generates an image in which the auxiliary line is not superimposed or is superimposed in a semi-transparent state at least at the overlapping portion, and, when the rear-view image does not include the overlapping portion, generates an image in which the auxiliary line is superimposed on the rear-view image.

A camera according to the present disclosure includes: an imager that captures a rear-view image of a rear view from a vehicle; and the above-described image generation apparatus.

A display system according to the present disclosure includes: an imager that captures a rear-view image of a rear view from a vehicle; the above-described image generation apparatus; and a display that displays an image generated by the above-described image generation apparatus.

A vehicle according to the present disclosure includes: the above-described camera or the above-described display system.

Advantageous Effects of Disclosure

According to the present disclosure, it is possible to provide an image generation apparatus capable of generating an image making it possible to assist reverse driving without disturbing safe reverse driving of a vehicle by a driver, a camera and a display system including the image generation apparatus, and a vehicle including the same.

DESCRIPTION OF EMBODIMENTS

Hereinafter, an embodiment of the present disclosure will be described with reference to the accompanying drawings.

Embodiment 1

Figure 1:
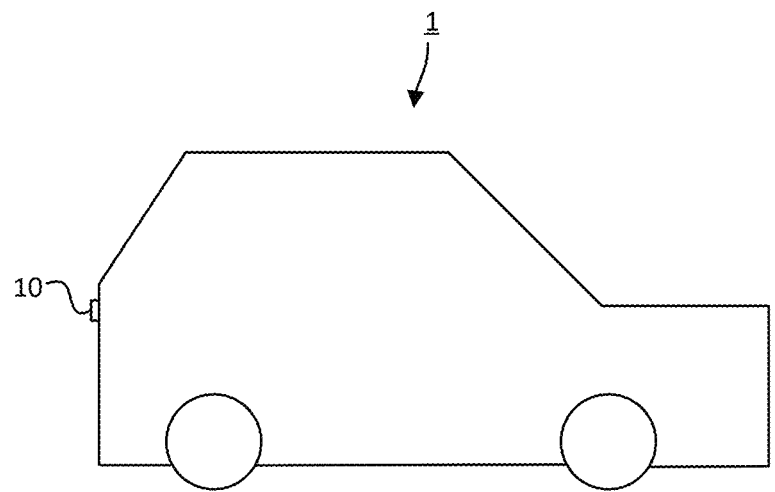
FIG. 1 schematically illustrates a vehicle including a rear camera according to Embodiment 1 of the present disclosure.

FIG. 1 schematically illustrates vehicle 1 including rear camera 10 according to Embodiment 1 of the present disclosure.

Vehicle 1 includes rear camera 10 in the rear of vehicle 1. Rear camera 10 captures an image of a rear view from vehicle 1. The image captured by rear camera 10 is displayed on display 50 (see FIG. 3) in vehicle 1. Further, when a driver of vehicle 1 performs reverse driving, the image captured by rear camera 10 is displayed on display 50 in vehicle 1 after the auxiliary line for assisting the driver's reverse driving is superimposed on the image.

Figure 2:
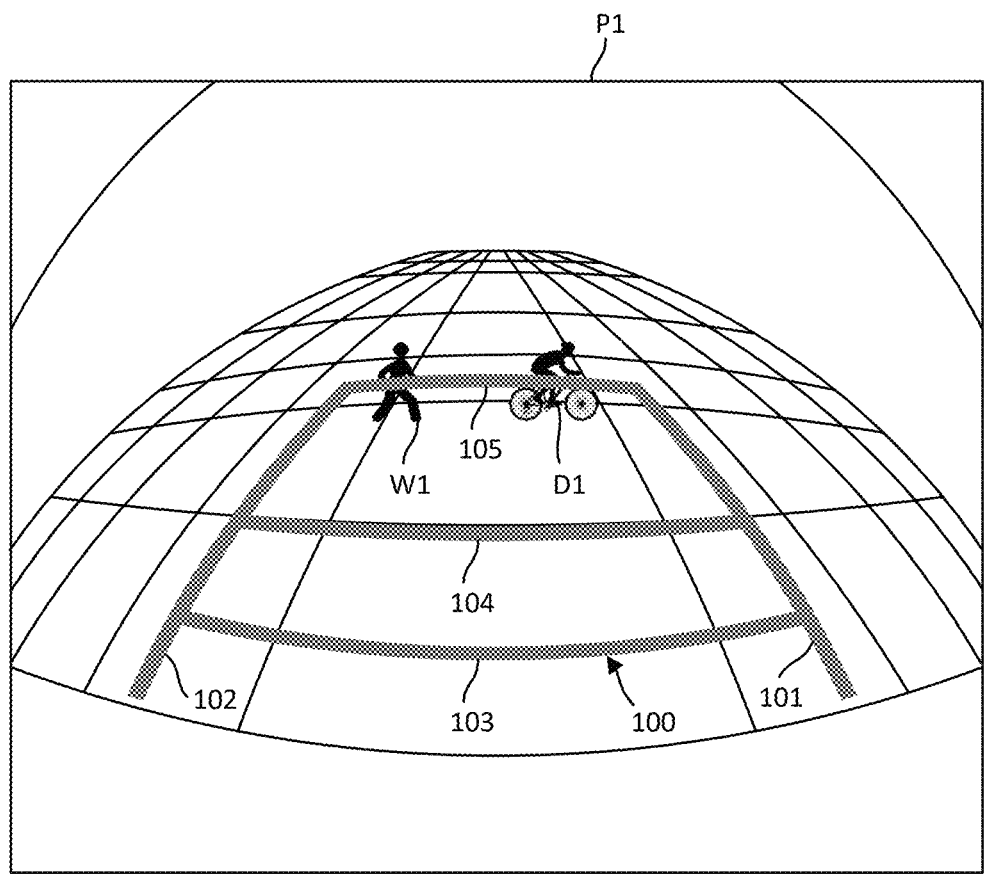
FIG. 2 illustrates an example of an image (driving assistance image) that is an image (rear-view image) of a rear view from the vehicle on which an auxiliary line is superimposed.

FIG. 2 illustrates an example of an image (driving assistance image P1) that is an image (rear-view image) of a rear view from vehicle 1 on which auxiliary line 100 is superimposed.

Auxiliary line 100 includes a plurality of lines. For example, auxiliary line 100 includes vehicle-width extension lines 101 and 102, and rear distance reference lines 103, 104, and 105. Vehicle-width extension lines 101 and 102 indicate the positions of one end and the other end of the vehicle width when vehicle 1 is reversed. Rear distance reference lines 103, 104, and 105 indicate positions respective predetermined distances away from the rear end of vehicle 1. For example, rear distance reference line 103 indicates the position X1 meters away from the rear end of vehicle 1, rear distance reference line 104 indicates the position X2 (>X1) meters away from the rear end of vehicle 1, and rear distance reference line 105 indicates the position X3 (>X2) meters away from the rear end of vehicle 1. Hereafter, the vehicle-width extension lines and the rear distance reference lines are simply referred to as "lines."

Thus, when an image in which auxiliary line 100 is superimposed on a rear-view image of vehicle 1 is displayed on display 50 of vehicle 1, it is possible for the driver to easily perform reverse driving for parking the vehicle (into a garage).

However, as illustrated in FIG. 2, when auxiliary line 100 is superimposed on the rear-view image of vehicle 1, auxiliary line 100 may be superimposed on pedestrian W1 and/or bicycle rider D1 appearing in the rear-view image. In this case, it is difficult for the driver to recognize that bicycle rider D1 and/or pedestrian W1 are present, when viewing driving assistance image P1.

According to the present disclosure, when a specific object such as a person is present behind vehicle 1, it is possible to display a driving assistance image that does not disturb recognition of the specific object by the driver of vehicle 1. Hereinafter, Embodiment 1 of the present disclosure will be described.

Figure 3:
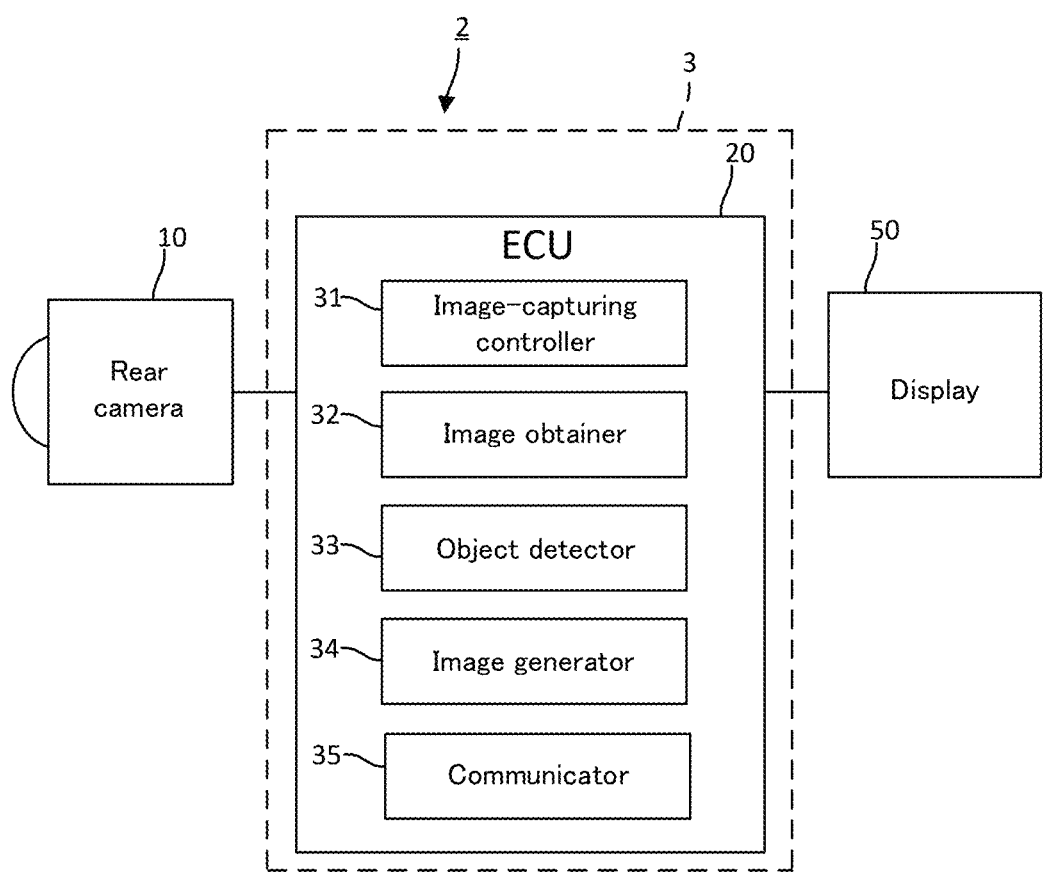
FIG. 3 is a block diagram illustrating a configuration of a display system according to Embodiment 1 of the present disclosure.

FIG. 3 is a block diagram illustrating a configuration of display system 2 according to Embodiment 1 of the present disclosure. Vehicle 1 illustrated in FIG. 1 includes display system 2. Display system 2 includes rear camera 10, vehicle controller (Electronic Control Unit (ECU)) 20, and display 50. In the present embodiment, ECU 20 functions as image generation apparatus 3 that generates a driving assistance image on which auxiliary line 100 is superimposed.

Rear camera 10 captures a rear-view image of vehicle 1. Further, rear camera 10 transmits the captured image to ECU 20.

ECU 20 includes a Central Processing Unit (CPU) and a memory including a ROM and a RAM. The CPU reads a control program stored in the ROM, loads the program into the RAM, and executes the loaded program to function as image-capturing controller 31, image obtainer 32, object detector 33, image generator 34, and communicator 35.

Image-capturing controller 31 controls capturing of a rear-view image by rear camera 10. Specifically, when the driving mode of vehicle 1 is set to a reverse driving mode, image-capturing controller 31 transmits, to rear camera 10, a signal (image-capturing start signal) for causing rear camera 10 to start capturing an image. Further, when the driving mode of vehicle 1 is switched from the reverse driving mode to another driving mode, image-capturing controller 31 transmits, to rear camera 10, a signal (image-capturing stop signal) for causing rear camera 10 to stop capturing of the image.

The driving modes include a forward driving mode for vehicle 1 to move forward, the reverse driving mode for vehicle 1 to move backward, a stop mode for stopping vehicle 1, and the like. Setting the driving mode to the reverse driving mode includes switching from the forward driving mode to the reverse driving mode, and switching from the stop mode to the reverse driving mode.

Image obtainer 32 obtains, via communicator 35, a rear-view image of vehicle 1 captured by rear camera 10.

Object detector 33 detects a specific object appearing in the rear-view image obtained by image obtainer 32 and the position of the specific object in the rear-view image. Specific objects are preset, and examples of the specific objects include people such as a pedestrian, a bicycle rider, and the like, and a moving object. Settings related to the specific objects are stored in the memory of ECU 20.

Image generator 34 generates an image to be displayed on display 50. Specifically, image generator 34 generates the driving assistance image based on a detection result of object detector 33 and the rear-view image. Further, image generator 34 transmits the generated driving assistance image via communicator 35 to display 50. Image generator 34 will be described in greater detail below.

Communicator 35 can communicate with equipment included in vehicle 1, such as rear camera 10 and display 50, via an in-vehicle network such as Controller Area Network (CAN).

Display 50 is a monitor provided inside vehicle 1. Display 50 displays the driving assistance image generated by ECU 20.

Figure 4:
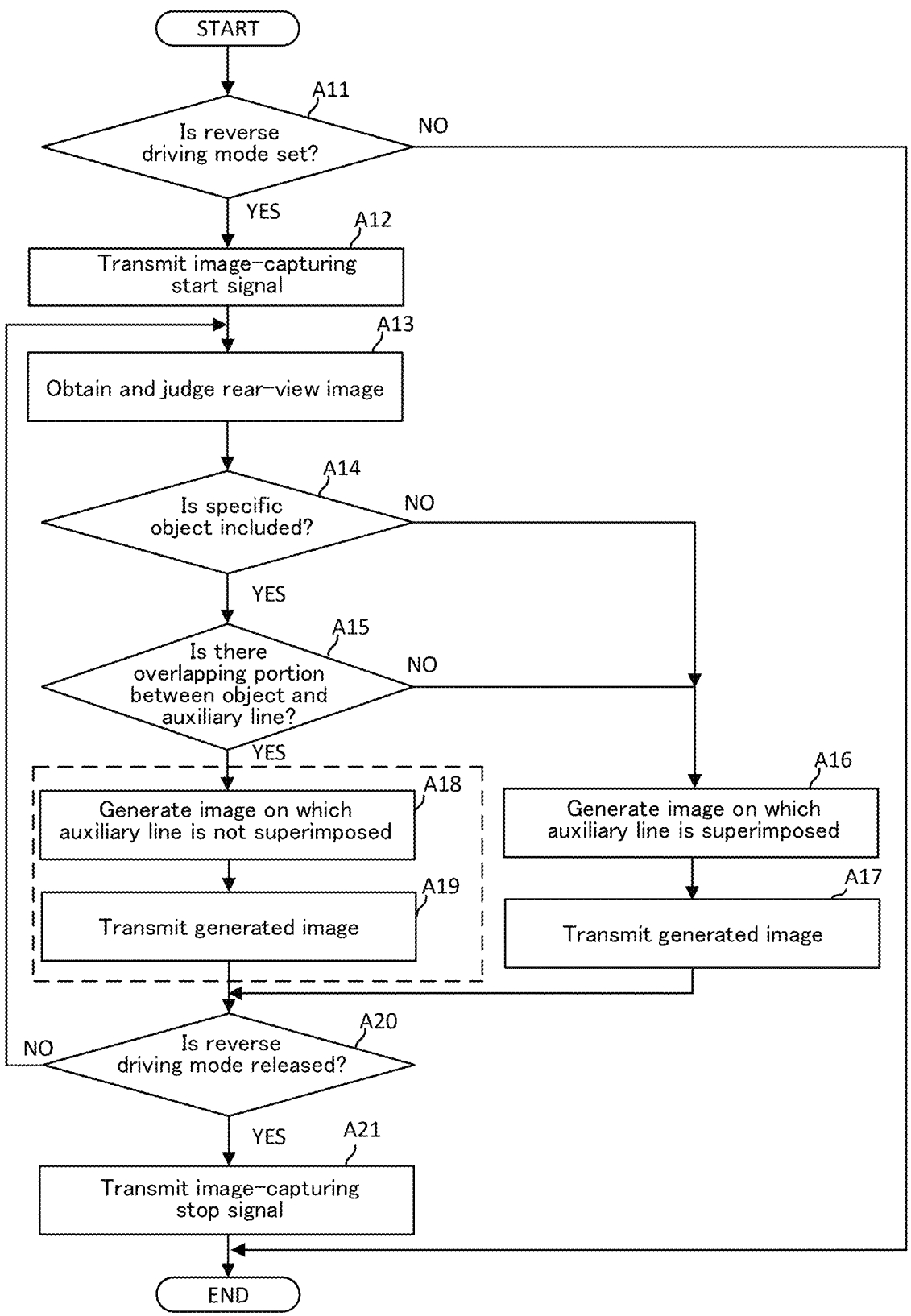
FIG. 4 is a flowchart illustrating an operation performed by an image generation apparatus according to Embodiment 1 of the present disclosure.
Figure 5:
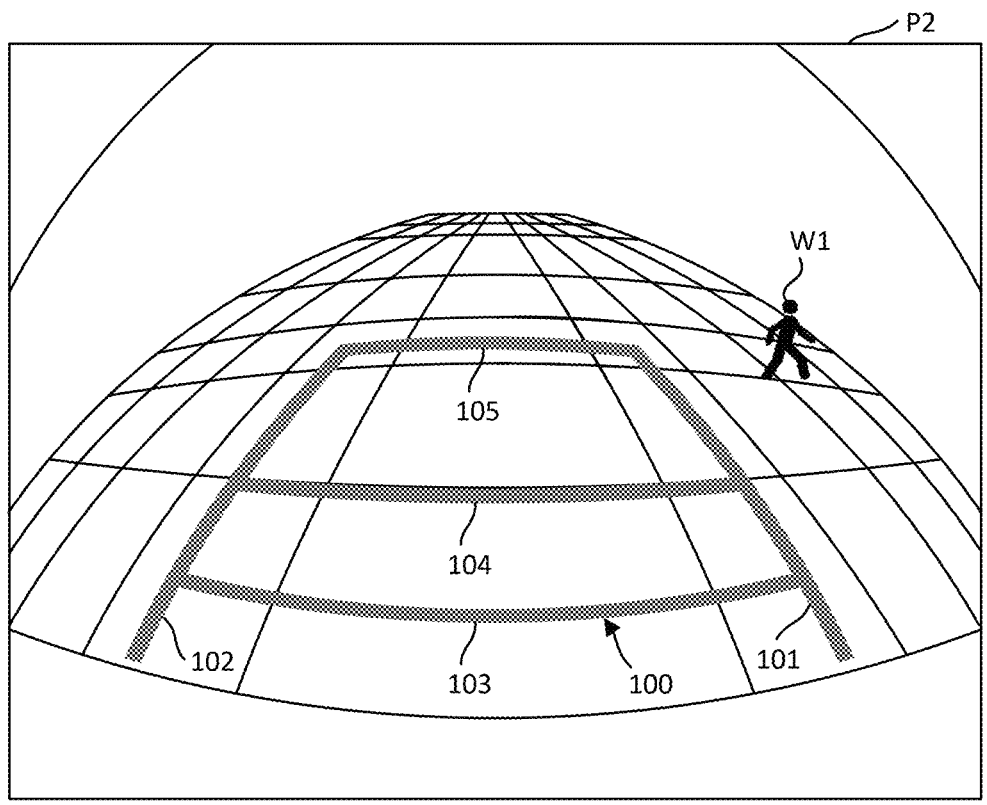
FIG. 5 illustrates an example of the driving assistance image generated by the image generation apparatus according to Embodiment 1 of the present disclosure.
Figure 6:
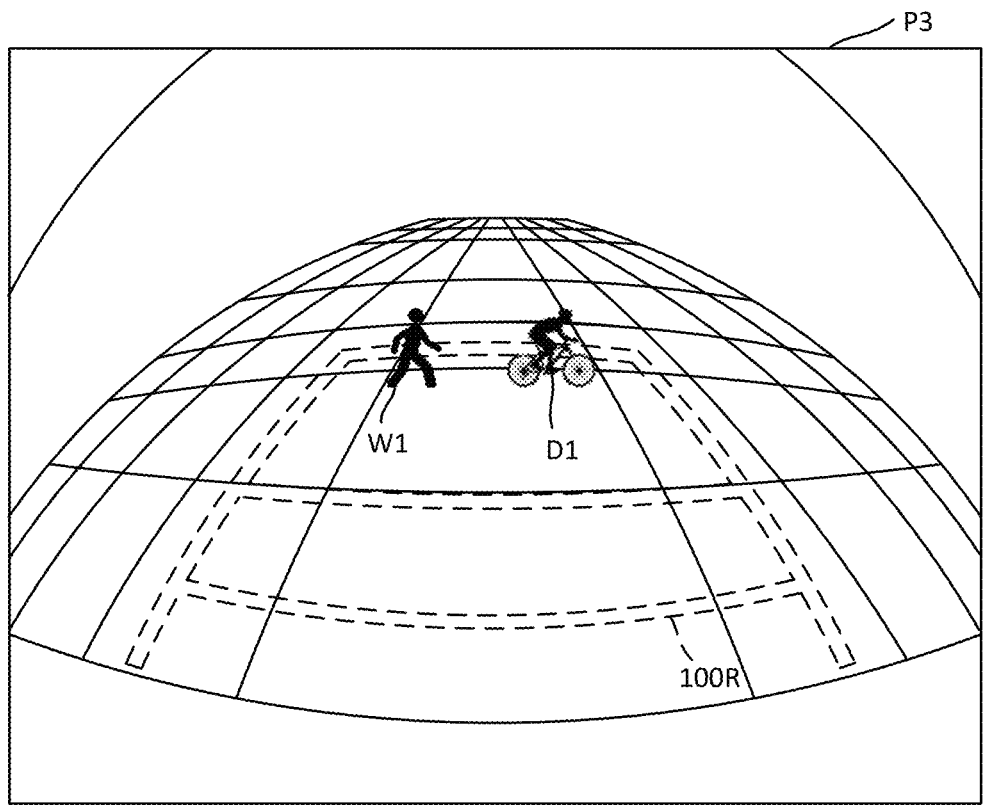
FIG. 6 illustrates an example of the driving assistance image generated by the image generation apparatus according to Embodiment 1 of the present disclosure.

Next, the operation of display system 2 according to Embodiment 1 of the present disclosure will be described with reference to FIGS. 4, 5, and 6. FIG. 4 is a flowchart illustrating an operation performed by image generation apparatus 3 according to Embodiment 1 of the present disclosure. FIGS. 5 and 6 illustrate examples of the driving assistance image generated by image generation apparatus 3.

Image-capturing controller 31 judges whether or not the driving mode of vehicle 1 is set to the reverse driving mode (step A11). Here, image-capturing controller 31 is capable of judging whether or not the driving mode of vehicle 1 is set to the reverse driving mode, by detecting whether or not the transmission is set to reverse.

When the driving mode of vehicle 1 is not set to the reverse driving mode (NO in step A11), the operation of image generation apparatus 3 ends.

When the driving mode of vehicle 1 is switched to the reverse driving mode (YES in step A11), image-capturing controller 31 transmits the image-capturing start signal to rear camera 10 (step A12). When receiving the image-capturing start signal, rear camera 10 starts capturing a rear-view image of vehicle 1. Captured rear-view images are sequentially transmitted to ECU 20.

Next, image obtainer 32 obtains the rear-view image captured by rear camera 10 (in step A13). Then, object detector 33 judges whether or not the rear-view image includes a specific object stored in the memory (step A14).

When the rear-view image does not include any specific object (NO in step A14), image generator 34 generates an image in which auxiliary line 100 is superimposed on the rear-view image (step A16).

Here, image generator 34 estimates the traveling direction of vehicle 1 based on the steering angle of vehicle 1. Next, based on the estimation result and the entire width of vehicle 1 or the like, image generator 34 determines an image region of the rear-view image in which auxiliary line 100 is superimposed. Then, image generator 34 superimposes auxiliary line 100 in the determined image region.

Next, image generator 34 transmits the generated driving assistance image to display 50 (step A17). The driving assistance image transmitted by ECU 20 is displayed on display 50. After the driving assistance image is transmitted by ECU 20, the operation proceeds to A20.

When the rear-view image includes a specific object (YES in step A14), image generator 34 judges whether or not the rear-view image includes an overlapping portion between the image region of the rear-view image in which auxiliary line 100 is superimposed and an image region of the rear-view image in which the specific object is located (step A15). Hereinafter, the overlapping portion between the image region of the rear-view image in which auxiliary line 100 is superimposed and the image region of the rear-view image in which the specific object is located is referred to as the "overlapping portion."

Here, object detector 33 detects the specific object, and detects the position of the specific object in the rear-view image. Further, by the above-described method, image generator 34 determines the image region in which auxiliary line 100 is to be superimposed. Then, based on the image region in which the specific object detected by object detector 33 is located and the image region in which determined auxiliary line 100 is to be superimposed, image generator 34 judges whether or not the overlapping portion is present in the rear-view image.

When the rear-view image does not include any overlapping portion (NO in step A15), image generator 34 superimposes auxiliary line 100 on the rear-view image to generate a driving assistance image (step A16). Next, image generator 34 transmits the generated driving assistance image to display 50 (in step A17). The driving assistance image transmitted from ECU 20 is displayed on display 50.

Driving assistance image P2 that is an example of the driving assistance image displayed on display 50 at this time is illustrated in FIG. 5. Auxiliary line 100 is superimposed on driving assistance image P2, in which pedestrian W1 appears. Note that the driving assistance image generated in step A16 when the rear-view image does not include a specific object does not include pedestrian W1 included in driving assistance image P2.

After driving assistance image P2 is transmitted from ECU 20, the operation proceeds to step A20.

When the rear-view image includes the overlapping portion (YES in step A15), image generator 34 generates a driving assistance image in which auxiliary line 100 is not superimposed on the rear-view image (step A18). Next, image generator 34 transmits the generated driving assistance image to display 50 (in step A19). Thereafter, the driving assistance image is displayed on display 50.

Driving assistance image P3 that is an example of the driving assistance image displayed on display 50 at this time is illustrated in FIG. 6. Image region 100R of FIG. 6 illustrates the image region of the rear-view image in which auxiliary line 100 could be superimposed, that is, the image region on the assumption that auxiliary line 100 is superimposed on the rear-view image. The dashed line, which is the border of image region 100R in FIG. 6, is illustrated for the sake of explanation only, and is not actually displayed in driving assistance image P3. Accordingly, driving assistance image P3 does not include auxiliary line 100 at all.

After driving assistance image P3 is transmitted from ECU 20, the operation proceeds to step A20.

In step A20, image-capturing controller 31 judges whether or not the reverse driving mode is released, i.e., whether or not the driving mode of vehicle 1 is switched from the reverse driving mode to another driving mode (step A20). Here, the other driving mode is, for example, the forward driving mode or the stop mode. Image-capturing controller 31 performs the judgement in the same manner as the method described in relation to step A11.

When the reverse driving mode is not released (NO in step A20), the operation proceeds to step A13. On the other hand, when the reverse driving mode is released (YES in step A20), image-capturing controller 31 transmits the image-capturing stop signal to rear camera 10 (step A21). When receiving the image-capturing stop signal, rear camera 10 stops capturing the rear-view image. When image capturing is stopped, image generation apparatus 3 is incapable of obtaining the rear-view image from rear camera 10 and thus cannot transmit, to display 50, the driving assistance image to be displayed on display 50. Accordingly, displaying the driving assistance image on display 50 is stopped. Thereafter, the operation of image generation apparatus 3 ends.

Note that, auxiliary line 100 does not necessarily have to includes lines 101, 102, 103, 104, and 105. For example, auxiliary line 100 does not have to include line 104.

As described above, according to Embodiment 1, when the rear-view image includes the overlapping portion, driving assistance image P3 in which auxiliary line 100 is not superimposed on the rear-view image is generated. Therefore, by displaying driving assistance image P3 on display 50 in vehicle 1, it becomes easier for the driver of vehicle 1 to recognize the specific objects of a pedestrian and the like. It is thus possible for the driver to perform safe reverse driving of vehicle 1.

On the other hand, when the rear-view image does not include any overlapping portion, the driving assistance image in which auxiliary line 100 is superimposed on the rear-view image (driving assistance image P2 or the like) is generated. Therefore, by displaying driving assistance image P2 on display 50 in vehicle 1, it is possible for the driver to perform reverse driving while seeing auxiliary line 100. It is thus possible for the driver to easily perform the reverse driving.

That is, according to Embodiment 1, it is possible to generate an image making it possible to assist reverse driving without disturbing safe reverse driving of vehicle 1 by the driver.

Figure 7:
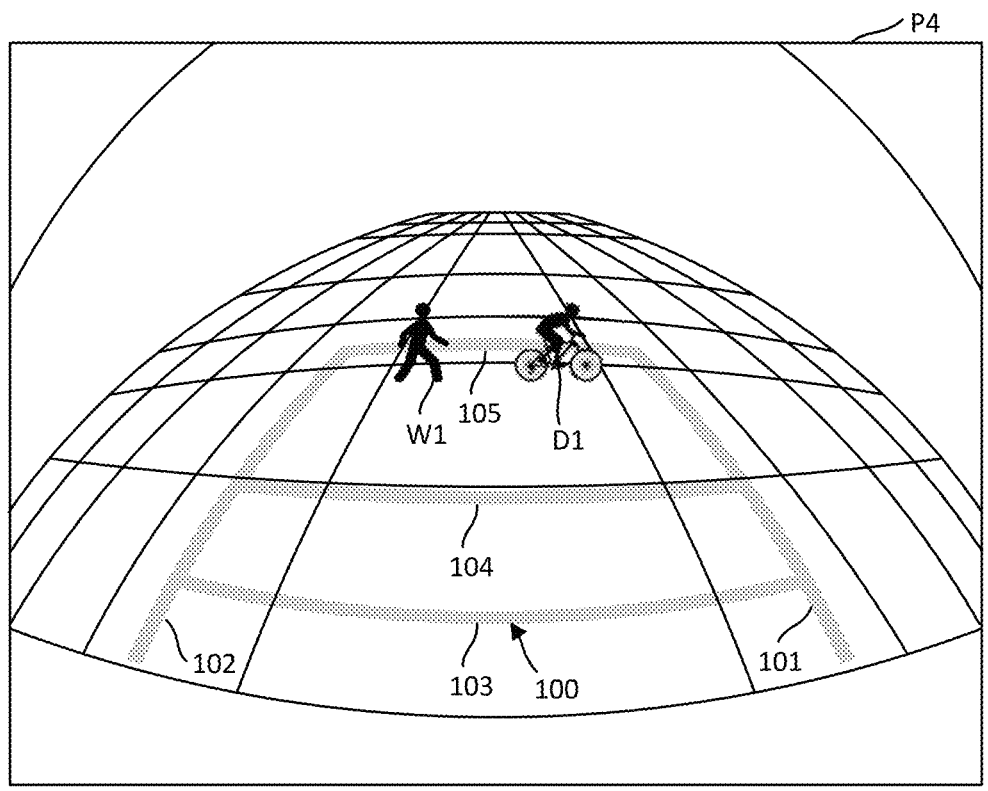
FIG. 7 illustrates an example of the driving assistance image generated by the image generation apparatus according to a modification of the present disclosure.

Note that, in the present embodiment, instead of generating driving assistance image P3 in which auxiliary line 100 is not superimposed, driving assistance image P4 illustrated in FIG. 7 may be generated. FIG. 7 illustrates an example of the driving assistance image generated by image generation apparatus 3 according to a modification.

Driving assistance image P4 is an image in which auxiliary line 100 is superimposed in a semi-transparent state on the rear-view image. When auxiliary line 100 is in a semi-transparent state, the driver of vehicle 1 can easily recognize specific objects even when auxiliary line 100 is superimposed on pedestrian W1 and bicycle rider D1 which are the specific objects. Also, in an image region in which no specific object is located, semi-transparent auxiliary line 100 is visible to the driver. Therefore, when the rear-view image includes the overlapping portion, the same effect as that of the above-described embodiment can be obtained also by generating the driving assistance image in which auxiliary line 100 is superimposed in a semi-transparent state on the rear-view image.

Embodiment 2

Hereinafter, Embodiment 2 of the present disclosure will be described with reference to FIG. 8. In the below-described embodiment, portions having the same effects as in Embodiment 1 described above are provided with the same reference numerals between the embodiments, and the description of such portions will be omitted. In the following description, differences between the present embodiment and Embodiment 1 will be mainly described. Note that the configurations of display system 2 and image generation apparatus 3 of Embodiment 2 are the same as those illustrated in FIG. 3.

Figure 8:
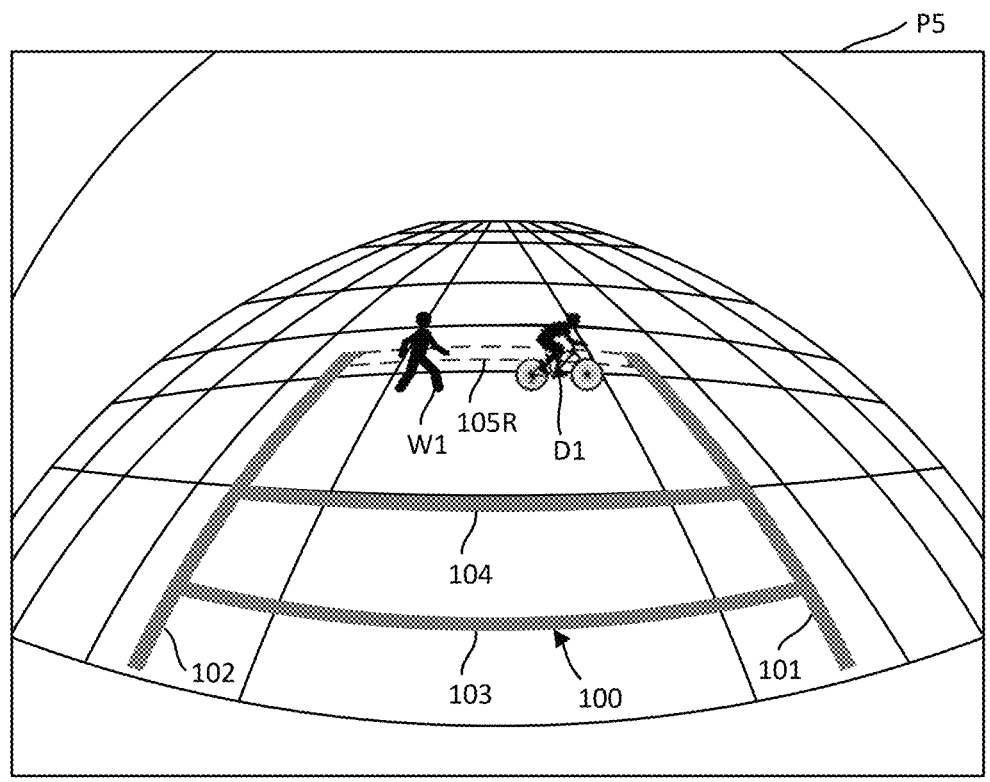
FIG. 8 illustrates an example of the driving assistance image generated by the image generation apparatus according to Embodiment 2 of the present disclosure.

FIG. 8 is an example of an image generated by image generation apparatus 3 according to Embodiment 2 of the present disclosure in a case where, in the rear-view image, the image region in which auxiliary line 100 for assisting the reverse driving of vehicle 1 is superimposed overlaps with the image region in which a specific object is located.

In Embodiment 2, when the rear-view image includes an overlapping portion, image generator 34 generates driving assistance image P5 in which lines 101 to 104 are superimposed and line 105 is not superimposed. At this time, the image region of the rear-view image in which lines 101, 102, 103, and 104 are superimposed does not include any overlapping portion. On the other hand, the image region of the rear-view image in which line 105 could be superimposed includes overlapping portions.

In other words, image generator 34 does not superimpose, on the rear-view image, only a line that, if superimposed on the rear-view image, is to be superimposed in the image region in which the specific objects are located, whereas image generator 34 superimposes the other lines of auxiliary line 100 on the rear-view image.

Thus, driving assistance image P5 includes lines 101, 102, 103, and 104. Image region 105R of FIG. 8 is an image region of the rear-view image in which line 105 could be superimposed, that is, an image region in which line 105 is to be located if superimposed on the rear-view image. The dashed line representing the border of image region 105R in FIG. 8 is illustrated for convenience of explanation only, and is not actually displayed in driving assistance image P5.

The operation of image generation apparatus 3 of Embodiment 2 is the same as the operation illustrated in FIG. 4, except for generating above-described driving assistance image P5 in step A18 of FIG. 4.

As described above, according to Embodiment 2, when the rear-view image includes an overlapping portion, driving assistance image P5 is generated in which line 105 that, if superimposed on the rear-view image, is to be superimposed in the image region in which a specific object is located is not superimposed. Thus, in Embodiment 2 as in Embodiment 1, it is possible to generate an image making it possible to assist reverse driving without disturbing safe reverse driving of vehicle 1 by a driver. Further, by displaying driving assistance image P5 on display 50, it is possible to assist reverse driving without disturbing safe reverse driving of vehicle 1 by the driver.

Further, driving assistance image P5 generated in Embodiment 2 includes lines 101 to 104 which do not overlap with the image region in which the specific objects are located. Thus, in comparison with driving assistance image P3 in which all of lines 101 to 105 are not superimposed, it is possible to generate an image making it possible to more effectively assist the driver of vehicle 1 with driving.

Note that, image generator 34 may generate a driving assistance image in which lines 101 to 104 are superimposed on the rear-view image and line 105 is superimposed in a semi-transparent state, instead of generating driving assistance image P5. Also in this case, the same effect as in Embodiment 2 described above is achieved.

Embodiment 3

Hereinafter, Embodiment 3 of the present disclosure will be described with reference to FIG. 9. In the below-described embodiment, portions having the same effects as in Embodiment 1 described above are provided with the same reference numerals between the embodiments, and the description of such portions will be omitted. In the following description, differences between the present embodiment and Embodiment 1 will be mainly described. Note that the configurations of display system 2 and image generation apparatus 3 of Embodiment 3 are the same as those illustrated in FIG. 3.

Figure 9:
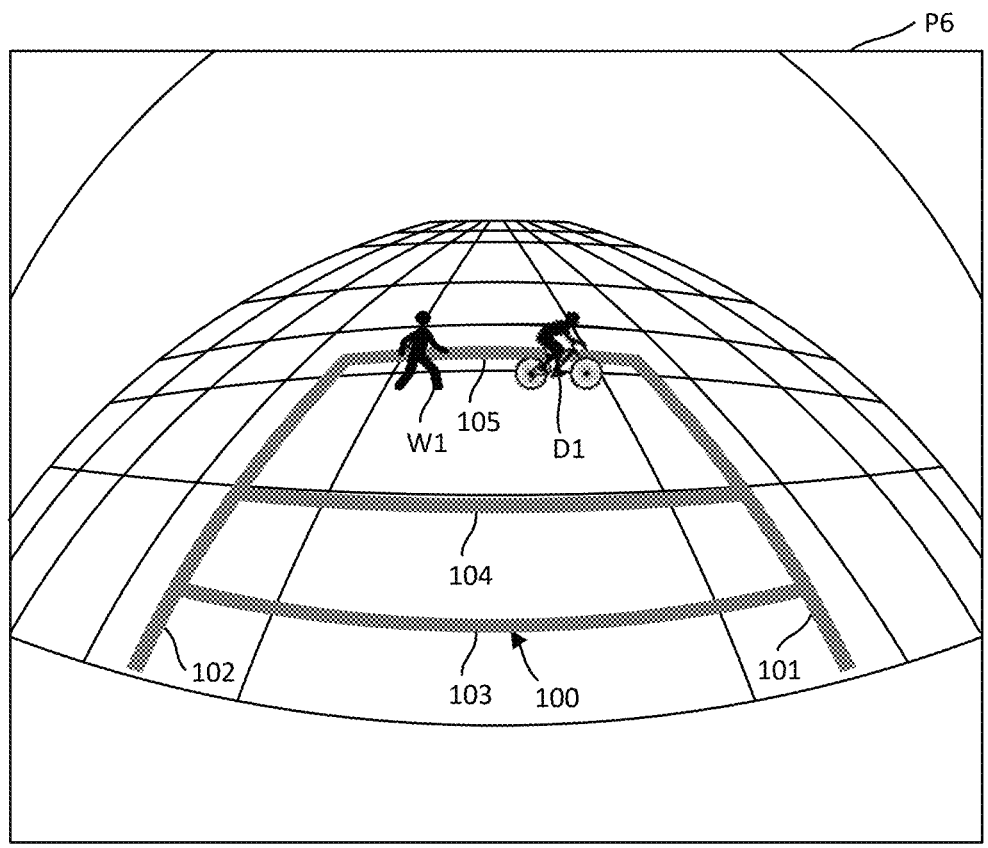
FIG. 9 illustrates an example of the driving assistance image generated by the image generation apparatus according to Embodiment 3 of the present disclosure.

FIG. 9 illustrates an example of the driving assistance image generated by image generation apparatus 3 according to Embodiment 3 of the present disclosure when, in the rear-view image, the image region in which auxiliary line 100 for assisting reverse driving of vehicle 1 is superimposed overlaps with the image region in which a specific object is located.

In Embodiment 3, when the rear-view image includes an overlapping portion, image generator 34 generates driving assistance image P6 in which auxiliary line 100 is not superimposed at the overlapping portion.

Driving assistance image P6 is an image in which lines 101, 102, 103, and 104 are superimposed on the rear-view image and line 105 is superimposed on the rear-view image in an image region other than the overlapping portions. Therefore, in driving assistance image P6, it seems as if pedestrian W1 and bicycle rider D1 are disposed on the front side of line 105.

The operation of image generation apparatus 3 of Embodiment 3 is the same as the operation illustrated in FIG. 4, except for generating above-described driving assistance image P6 in step A18 of FIG. 4.

As described above, according to Embodiment 3, when the rear-view image includes the overlapping portions, driving assistance image P6 in which the auxiliary line is not superimposed at the overlapping portions is generated. Thus, also in Embodiment 3 as in Embodiment 1, it is possible to generate an image making it possible to assist reverse driving without disturbing safe reverse driving of vehicle 1 by a driver. Further, by displaying driving assistance image P6 on display 50, it is possible to assist reverse driving without disturbing safe reverse driving of vehicle 1 by the driver.

Further, in driving assistance image P6 generated in Embodiment 3, auxiliary line 100 is superimposed on the portion of the image region other than the overlapping portions. Therefore, also in Embodiment 3 as in Embodiment 2, it is possible to generate an image making it possible to more effectively assist the driver of vehicle 1 with driving.

Note that, image generator 34 may generate a driving assistance image in which auxiliary line 100 is superimposed in a semi-transparent state at the overlapping portions, instead of driving assistance image P6. Also in this case, the same effect as in Embodiment 3 described above is achieved.

Embodiment 4

Hereinafter, Embodiment 4 of the present disclosure will be described. In the below-described embodiment, portions having the same effects as in Embodiment 1 described above are provided with the same reference numerals between the embodiments, and the description of such portions will be omitted. In the following description, differences between the present embodiment and Embodiment 1 will be mainly described. Note that the configurations of display system 2 and image generation apparatus 3 of Embodiment 4 are the same as those illustrated in FIG. 3.

Object detector 33 of Embodiment 4 detects an increase or decrease in the number of specific objects included in the rear-view image. Image generator 34 of Embodiment 4 switches between image generation modes in accordance with the increase or decrease of the number of specific objects included in the rear-view image. The image generation modes include a first image generation mode and a second image generation mode. The first image generation mode is an image generation mode in which, when the rear-view image includes an overlapping portion, a driving assistance image is generated in which only a line that, if superimposed, is to be superimposed in an image region in which a specific object is located is not superimposed but other lines are superimposed. That is, the first image generation mode is the image generation mode for generating driving assistance image P5 in Embodiment 2. The second image generation mode is an image generation mode in which, when the rear-view image includes an overlapping portion, a driving assistance image in which auxiliary line 100 is not superimposed is generated. That is, the second image generation mode is the image generation mode for generating driving assistance image P3 in Embodiment 1.

Figure 10:
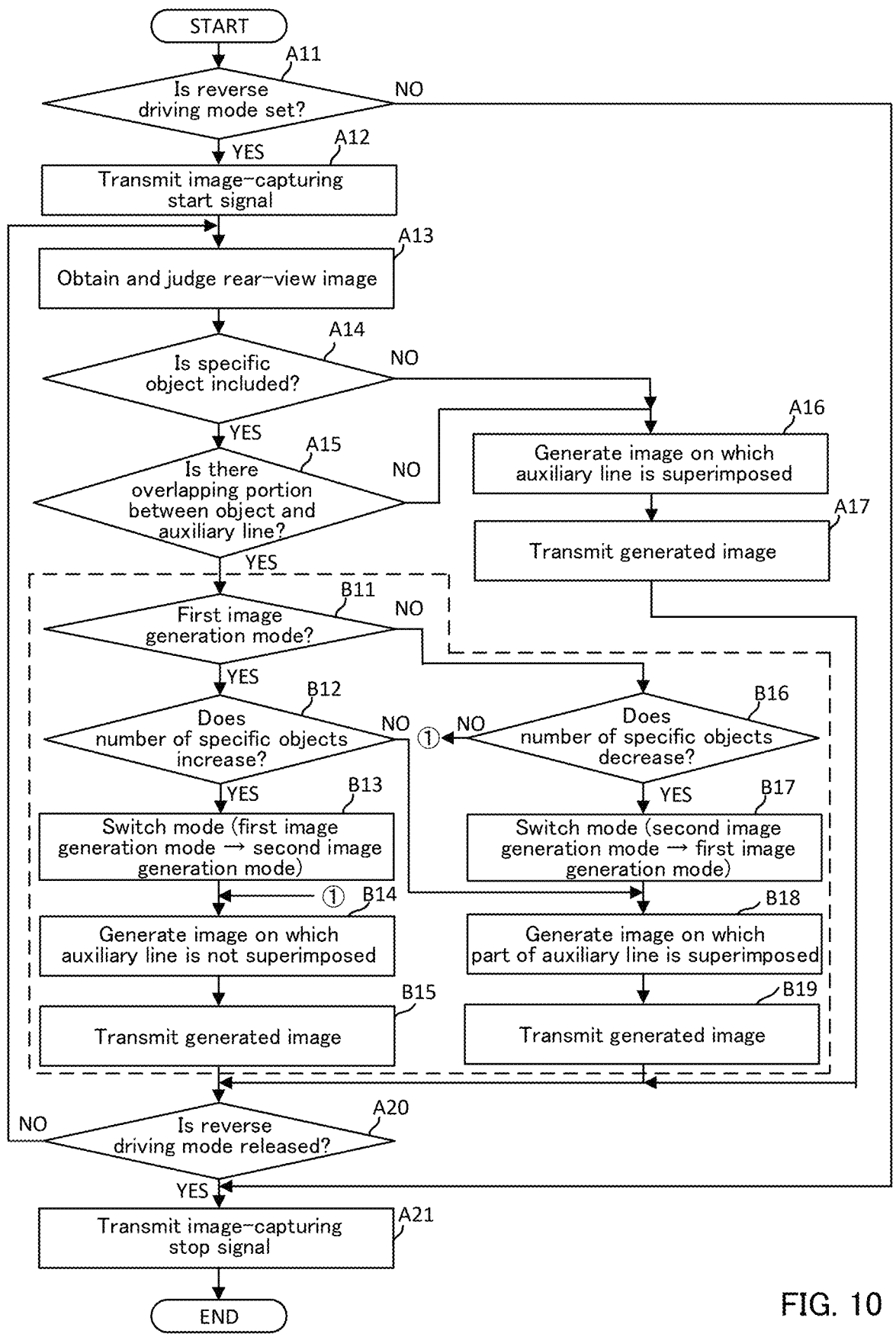
FIG. 10 is a flowchart illustrating an operation performed by an image generation apparatus according to Embodiment 4 of the present disclosure.
Figure 11:
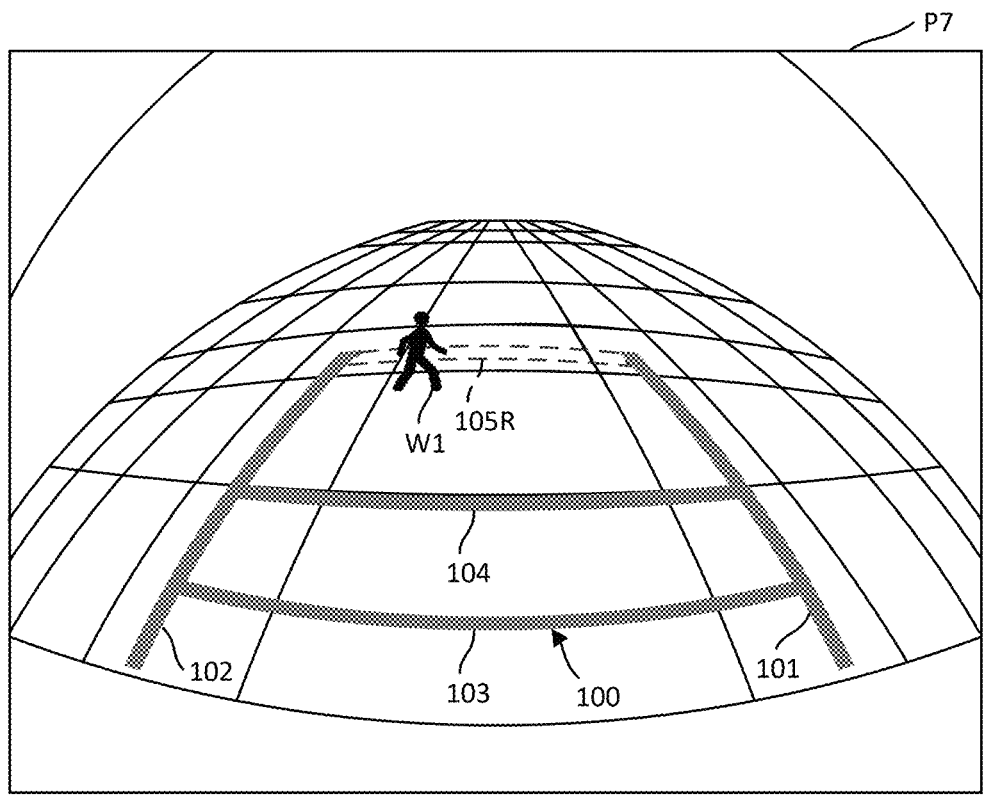
FIG. 11 illustrates an example of the driving assistance image generated by the image generation apparatus according to Embodiment 4 of the present disclosure.
Figure 12:
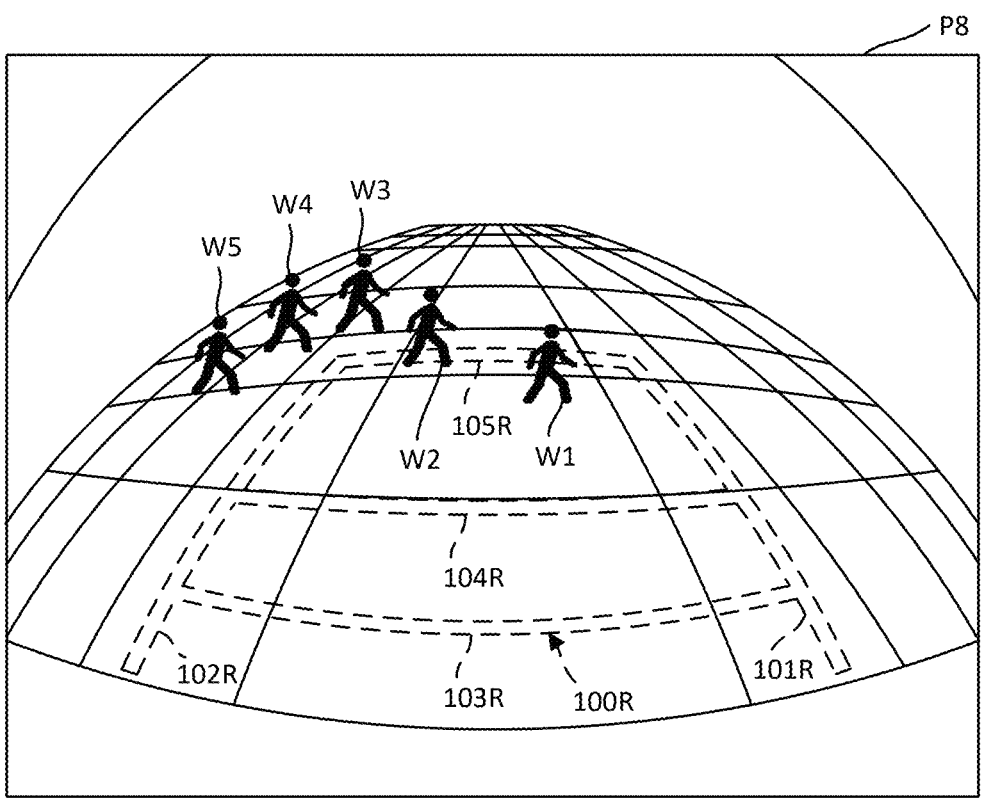
FIG. 12 illustrates an example of the driving assistance image generated by the image generation apparatus according to Embodiment 4 of the present disclosure.

Hereinafter, the operation of display system 2 according to Embodiment 4 will be described with reference to FIGS. 10, 11, and 12. FIG. 10 is a flowchart illustrating an operation performed by image generation apparatus 3 according to Embodiment 4 of the present disclosure. FIGS. 11 and 12 illustrate examples of the driving assistance image generated by image generation apparatus 3 according to Embodiment 4 of the present disclosure. Note that, in FIGS. 11 and 12, image regions 101R, 102R, 103R, 104R, and 105R respectively indicate image regions on the assumption that lines 101, 102, 103, 104, and 105 are superimposed on the rear-view image. The broken line indicating the border of image region 105R in FIG. 11 is not displayed in actual driving assistance image P7. Further, the broken line indicating the border of image regions 101R, 102R, 103R, 104R, and 105R in FIG. 12 (the border of image region 100R) is not displayed in actual driving assistance image P8.

Note that, in FIG. 10, processes the same as those of the flowchart illustrated in FIG. 4 are provided with the same reference numerals. Image generation apparatus 3 according to Embodiment 4 performs steps B11 to B19 in place of steps A18 and A19 framed by a broken line in FIG. 4.

When the rear-view image includes a specific object (YES in step A14), image generator 34 judges whether or not the rear-view image includes an overlapping portion (step A15). When the rear-view image includes the overlapping portion (YES in step A15), image generator 34 judges the current image generation mode (step B11).

When the current image generation mode is the first image generation mode (YES in step B11), object detector 33 judges whether or not the number of specific objects included in the rear-view image increases (step B12).

Note that, inclusion of a specific object in the rear-view image is detected in step A14. It is thus certain that the rear-view image includes at least one specific object at the time when the process of step B12 is performed. Accordingly, in step B12, the increase in the number of specific objects means an increase from a first number equal to or greater than 1 to a second number greater than the first number.

When the number of specific objects included in the rear-view image does not increase (NO in step B12), image generator 34 generates driving assistance image P7 in which a part of the auxiliary line illustrated in FIG. 11 is superimposed (step B18). Here, the "part of the auxiliary line" is lines (lines 101 to 104) other than a line (line 105) in auxiliary line 100 that, if superimposed on the rear-view image, is to be superimposed in the image region in which the specific object is located. After driving assistance image P7 is generated, image generator 34 transmits the generated driving assistance image to display 50 (step B19). Thereafter, the operation proceeds to step A20.

When the number of specific objects included in the rear-view image increases (YES in step B12), the following processes are performed. For example, a case is supposed where the rear-view image includes only pedestrian W1 as a specific object as illustrated in FIG. 11, and then, other pedestrians W2, W3, W4, and W5 intending to pass behind vehicle 1 come to appear in the rear-view image as illustrated in FIG. 12.

Image generator 34 switches the image generation mode from the first image generation mode to the second image generation mode (step B13). Then, image generator 34 generates driving assistance image P8 in which auxiliary line 100 illustrated in FIG. 12 is not superimposed (step B14). After driving assistance image P8 is generated, image generator 34 transmits generated driving assistance image P8 to display 50 (step B15). Thereafter, the operation proceeds to step A20.

When the current image generation mode is the second image generation mode (NO in step B11), object detector 33 judges whether or not the number of specific objects included in the rear-view image decreases (step B16).

Note that, inclusion of a specific object in the rear-view image is detected in step A14. It is thus certain that the rear-view image includes at least one specific object at the time when the process of step B16 is performed. Thus, in step B16, the decrease in the number of specific objects means a decrease from a third number equal to or greater than 2 to a fourth number equal to or greater than 1 but less than the third number.

When the number of specific objects included in the rear-view image does not decrease (NO in step B16), image generator 34 generates the driving assistance image illustrated in FIG. 12 in which no auxiliary line 100 is generated (step B14). Then, image generator 34 transmits the generated driving assistance image to display 50 (in step B15). Thereafter, the operation proceeds to step A20.

On the other hand, when the number of specific objects included in the rear-view image decreases (YES in step B16), image generator 34 switches the image generation mode from the second image generation mode to the first image generation mode (step B17). Then, image generator 34 generates driving assistance image P7 in which the part of auxiliary line 100 illustrated in FIG. 11 is superimposed (step B18), and transmits the generated driving assistance image to display 50 (step B19). Thereafter, the operation proceeds to step A20.

As described above, according to Embodiment 4, when the rear-view image includes the overlapping portion, driving assistance image P7 in which lines 101 to 104 that are not superimposed in the image region in which the specific object is located are superimposed or driving assistance image P8 in which auxiliary line 100 is not superimposed is generated. Thus, in Embodiment 4 as in Embodiment 1, it is possible to generate an image making it possible to assist reverse driving without disturbing safe reverse driving of vehicle 1 by a driver. Further, by displaying driving assistance image P7 or P8 on display 50, it is possible to assist reverse driving without disturbing safe reverse driving of vehicle 1 by the driver.

Further, according to Embodiment 4, the image generation mode is switched in accordance with the increase or decrease in the number of specific objects included in the rear-view image. When the number of people passing behind vehicle 1 increases, it is estimated that vehicle 1 cannot be reversed for a while. Accordingly, by displaying an image in which auxiliary line 100 is not superimposed, it is possible to stop the driving assistance to prompt a driver to stop vehicle 1. On the other hand, when the number of people passing behind vehicle 1 decreases, it can be estimated that vehicle 1 will soon be capable of being reversed. Accordingly, by displaying an image in which a part of an auxiliary line is superimposed, it is possible to start the driving assistance to prompt a driver of vehicle 1 to prepare for the start of vehicle 1.

Note that, image generator 34 may generate a driving assistance image in which lines 101 to 104 are superimposed on the rear-view image and line 105 is superimposed in a semi-transparent state, instead of generating driving assistance image P7. Note also that, image generator 34 may generate a driving assistance image in which auxiliary line 100 is superimposed in a semi-transparent state on the rear-view image, instead of generating driving assistance image P8. Also in this case, the same effect as in Embodiment 4 described above is achieved.

Embodiment 5

Hereinafter, Embodiment 5 of the present disclosure will be described with reference to FIG. 13. In the below-described embodiment, portions having the same effects as in Embodiment 1 described above are provided with the same reference numerals between the embodiments, and the description of such portions will be omitted. In the following description, differences between the present embodiment and Embodiment 1 will be mainly described. Note that the configurations of display system 2 and image generation apparatus 3 of Embodiment 5 are the same as those illustrated in FIG. 3.

Figure 13:
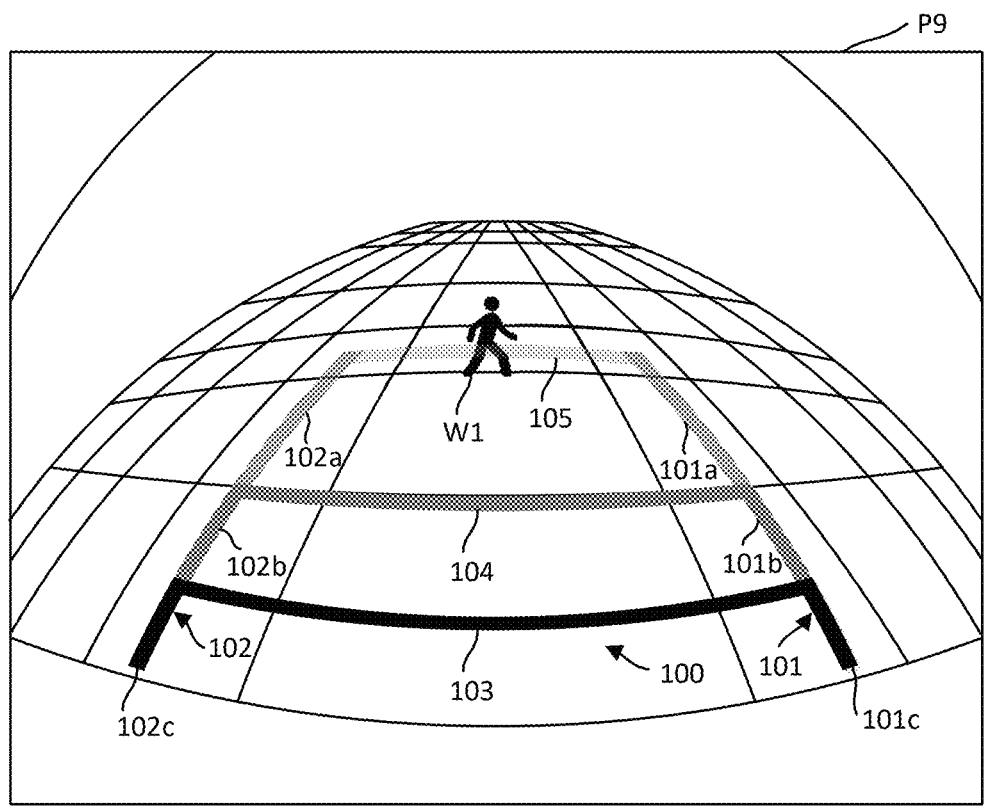
FIG. 13 illustrates an example of the driving assistance image generated by the image generation apparatus according to Embodiment 5 of the present disclosure.

In Embodiment 5, when a rear-view image includes an overlapping portion, image generator 34 generates driving assistance image P9 in which auxiliary line 100 is superimposed such that the transparency of auxiliary line 100 decreases with increasing distance from the overlapping portion as illustrated in FIG. 13. FIG. 13 illustrates an example of the driving assistance image generated by the image generation apparatus according to Embodiment 5 of the present disclosure.

In driving assistance image P9, the transparencies of lines included in auxiliary line 100 and of portions of the lines are higher in the order indicated below.
(1) Line 105
(2) Portion 101*a* that is a portion of line 101 and portion 102*a* that is a portion of line 102
(3) Line 104, portion 101*b* that is a portion of line 101, and portion 102*b* that is a portion of line 102
(4) Line 103, portion 101*c* that is a portion of line 101, and portion 102*c* that is a portion of line 102

That is, the transparency of line 105 superimposed at the overlapping portion is the highest. The transparencies of the lines decrease with increasing distance from the overlapping portion. The transparencies of line 103, portion 101*c*, and portion 102*c* which are the farthest from the overlapping portion are the lowest. Note that, the method of determining the transparency with respect to auxiliary line 100 is not limited to this. For example, rather than determining the transparency on a line-by-line basis and on a basis of the portions of the lines as described above, the transparency of auxiliary line 100 may be determined such that the transparency of auxiliary line 100 increases continuously with decreasing distance to the overlapping portion even in the same line or the same portion of a line.

As described above, according to Embodiment 5, when the rear-view image includes an overlapping portion, driving assistance image P9 in which the transparency of auxiliary line 100 is increased with decreasing distance to the overlapping portion is generated. Therefore, when displayed on display 50, driving assistance image P9 does not disturb the driver of vehicle 1 recognizing a specific object in the image region near the overlapping portion. Thus, in Embodiment 5 as in Embodiment 1, it is possible to generate an image making it possible to assist reverse driving without disturbing safe reverse driving of vehicle 1 by the driver. Further, by displaying driving assistance image P9 on display 50, it is possible to assist reverse driving without disturbing safe reverse driving of vehicle 1 by the driver.

Further, according to Embodiment 5, driving assistance image P9 is an image in which the transparency of the auxiliary line is lowered with increasing distance from the overlapping portion. Therefore, when driving assistance image P9 is displayed on display 50, the driver of vehicle 1 is easy to recognize auxiliary line 100 in an image region distant from the overlapping portion. It is thus possible to more effectively assist the driver of vehicle 1 with driving as compared to a case where driving assistance image P3 is generated in which none of lines 101 to 105 is superimposed or a case where a driving assistance image is generated in which all of lines 101 to 105 are superimposed in a semi-transparent state.

Note that, instead of driving assistance images P5, P6, and P7 generated in Embodiments 2, 3, and 4, a driving assistance image may be generated in which a portion of auxiliary line 100 is superimposed such that the transparency of auxiliary line 100 increases with decreasing distance to the overlapping portion.

Embodiment 6

Hereinafter, Embodiment 6 of the present disclosure will be described with reference to FIG. 14. In the below-described embodiment, portions having the same effects as in Embodiment 1 described above are provided with the same reference numerals between the embodiments, and the description of such portions will be omitted. In the following description, differences between the present embodiment and Embodiment 1 will be mainly described.

Figure 14:
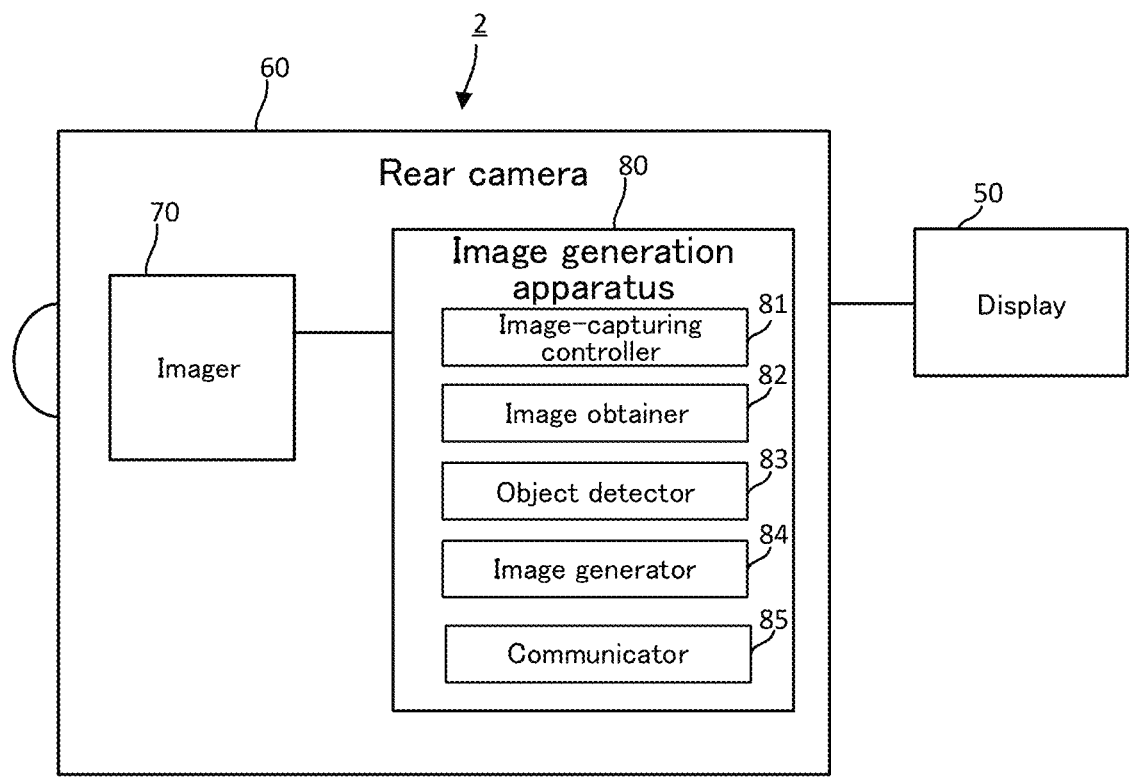
FIG. 14 is a block diagram illustrating a configuration of a display system according to Embodiment 6 of the present disclosure.

FIG. 14 is a block diagram illustrating a configuration of display system 2 according to Embodiment 6 of the present disclosure. Display system 2 of Embodiment 6 includes rear camera 60 and display 50.

Rear camera 60 includes imager 70 and image generation apparatus 80. ECU 20 functions as image generation apparatus 3 in Embodiment 1, but in Embodiment 6, image generation apparatus 80 is built in rear camera 60.

Imager 70 captures a rear-view image of vehicle 1. image generation apparatus 80 generates a driving assistance image based on the rear-view image captured by imager 70, and transmits the generated driving assistance image to display 50.

image generation apparatus 80 includes a CPU and a memory including a ROM and a RAM. The CPU reads a control program stored in the ROM, loads the program into the RAM, and executes the loaded program to function as image-capturing controller 81, image obtainer 82, object detector 83, image generator 84, and communicator 85.

Note that, image-capturing controller 81, image obtainer 82, object detector 83, image generation apparatus 84, and communicator 85 have the same functions respectively as image-capturing controller 31, image obtainer 32, object detector 33, image generator 34, and communicator 35 in Embodiment 1.

As described above, even in the case where the driving assistance image is generated in rear camera 60 as in Embodiment 6, it is possible to assist reverse driving without disturbing safe reverse driving of vehicle 1 by a driver as in Embodiment 1.

A description will be given below of further advantages of the image generation apparatus of the present disclosure that, when the rear-view image includes the overlapping portion, generates an image in which auxiliary line 100 is not superimposed at least at the overlapping portion or an image in which auxiliary line 100 is superimposed in a semi-transparent state at least at the overlapping portion.

Figure 15:
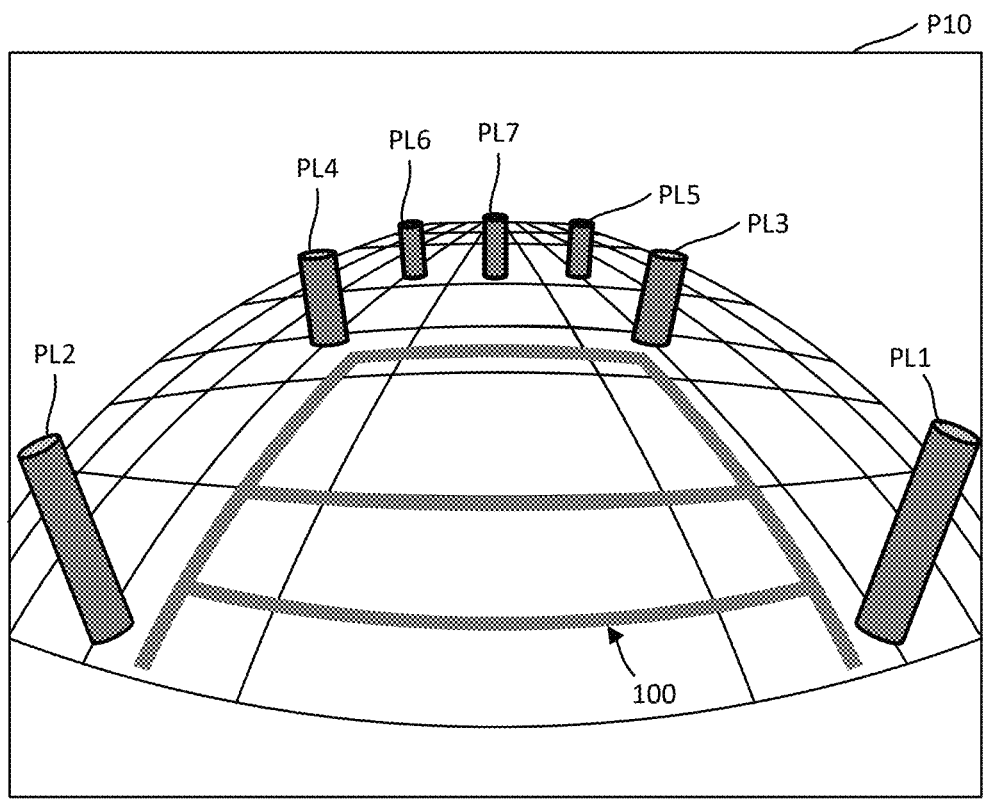
FIG. 15 illustrates an example of a driving assistance image generated by a conventional image generation apparatus when a rear camera is mounted in a vehicle at a designed position.

FIG. 15 illustrates an example of a driving assistance image generated by a conventional image generation apparatus when rear camera 10 is mounted in vehicle 1 at a designed position. It is supposed that vehicle 1 is parked into a garage by reverse driving to a location where poles PL1, PL2, PL3, PL4, PL5, PL6, and PL7 are arranged as illustrated in FIG. 15.

In driving assistance image P10 generated, auxiliary line 100 is superimposed on an image captured by rear camera 10. Since rear camera 10 is mounted in vehicle 1 at the designed position, auxiliary line 100 does not overlap with poles PL1 to PL7.

However, when the mounting position of rear camera 10 in vehicle 1 deviates from the designed position, auxiliary line 100 may overlap with poles PL1 to PL7 in the driving assistance image generated by the conventional image generation apparatus.

Figure 16:
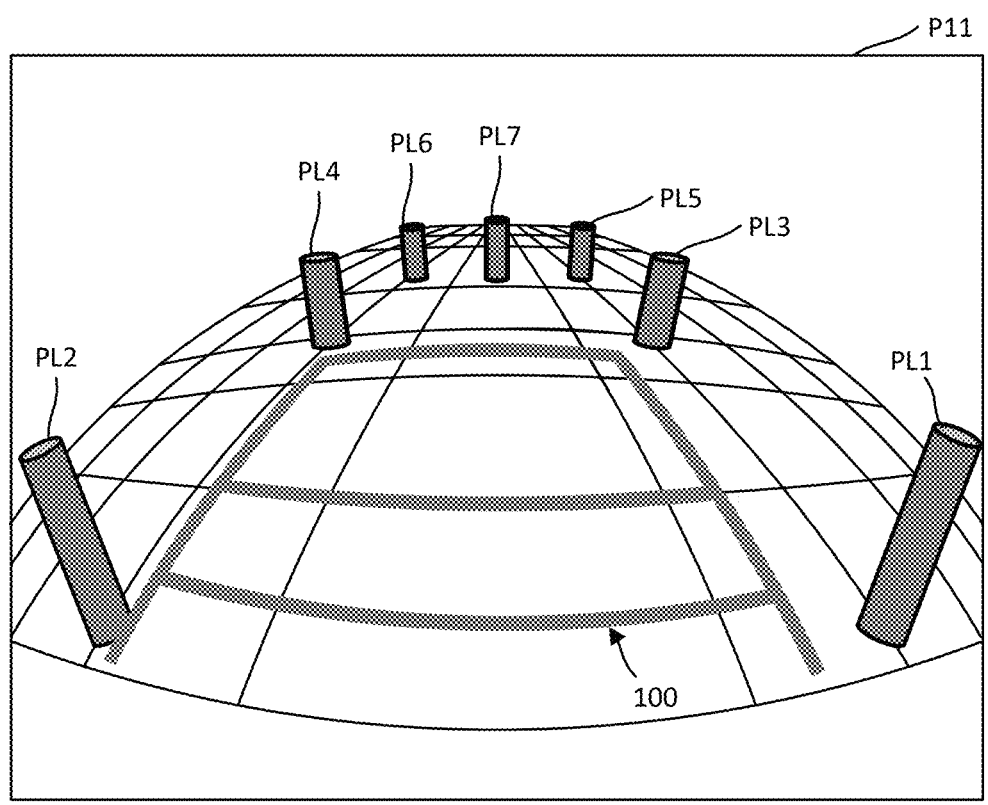
FIG. 16 illustrates an example of the driving assistance image generated by the conventional image generation apparatus when the rear camera is mounted in the vehicle at a position deviating from the designed position.

FIG. 16 illustrates an example of the driving assistance image generated by the conventional image generation apparatus when rear camera 10 is mounted in vehicle 1 at a position deviating from the designed position. In driving assistance image P11, auxiliary line 100 is shifted to the left to overlap with pole PL2.

That is, even though auxiliary line 100 does not overlap with the specific object when rear camera 10 is mounted at the designed position, auxiliary line 100 may overlap with the specific object when the mounting position of rear camera 10 deviates from the design position. When an image in which auxiliary line 100 overlaps with a specific object is generated, it is difficult for the driver to recognize the specific object even when the image is displayed on display 50.

However, according to the image generation apparatus of the present disclosure, a driving assistance image is generated in which auxiliary line 100 is not superimposed or is superimposed in a semi-transparent state in the image region of the rear-view image in which a specific object is located. Therefore, even when the mounting position of rear camera 10 deviates from the designed position, it is possible to generate an image making it possible to assist reverse driving without disturbing safe reverse driving of vehicle 1 by the driver. Further, by displaying this image on the display, it is possible to assist reverse driving without disturbing safe reverse driving of vehicle 1 by the driver.

<Notes>

In addition, the aforementioned embodiments merely describe examples of implementations for practicing the present disclosure, and should not be construed as limiting the technical scope of the present disclosure. In other words, the present disclosure can be implemented in various forms without departing from the scope, or essential features thereof. Namely, while various embodiments have been described herein above, it is to be appreciated that various changes in form and detail may be made without departing from the spirit and scope of the invention(s) presently or hereafter claimed.

This application is a continuation (in-part) of International Patent Application No. PCT/JP2019/048100, filed on Dec. 9, 2019, the disclosure of which is incorporated herein by reference in its entirety. International Patent Application No. PCT/JP2019/048100 is entitled to (or claims) the benefit of Japanese Patent Application No. 2019-056211, filed on Mar. 25, 2019, the disclosure of which is incorporated herein by reference in its entirety.

INDUSTRIAL APPLICABILITY

The present disclosure is utilized suitably in an image generation apparatus that is capable of generating an image that makes it possible to assist reverse driving without disturbing safe reverse driving of a vehicle by a driver.

REFERENCE SIGNS LIST

1 Vehicle
2 Display system
3, 80 Image generation apparatus
10, 60 Rear camera
20 ECU
31, 81 Image-capturing controller
32, 82 Image obtainer
33, 83 Object detector
34, 84 Image generator
35, 85 Communicator
50 Display
70 Imager
P1, P2, P3, P4, P5, P6, P7, P8, P9, P10, P11 Driving assistance image
PL1, PL2, PL3, PL4, PL5, PL6, PL7 Pole
100 Auxiliary line
101, 102 Vehicle-width extension line
103, 104, 105 Rear distance reference line
101*a*, 101*b*, 101*c*, 102*a*, 102*b*, 102*c* Portion
W1, W2, W3, W4, W5 Pedestrian
D1 Bicycle rider
100R, 101R, 102R, 103R, 104R, 105R Image region

The invention claimed is:

1. An image generation apparatus, comprising:
a processor; and
a memory including a control program that, when executed by the processor, causes the processor to:
  obtain a rear-view image of a rear view from a vehicle;
  when the rear-view image includes an overlapping portion between an image region in which auxiliary lines for assisting reverse driving of the vehicle is superimposed and an image region in which a specific object is located, generate a first image in which at least one of the auxiliary lines is not superimposed or is superimposed in a semi-transparent state at least at the overlapping portion; and when the rear-view image does not include the overlapping portion, generate a second image in which the auxiliary lines are superimposed on the rear-view image, wherein when the rear-view image includes the overlapping portion, the processor generates the first image in which a first line of the auxiliary lines is superimposed and a second line of the auxiliary lines is not superimposed or is superimposed in a semi-transparent state on the rear-view image, a first image region, of the first image, in which the first line is superimposed does not include the overlapping portion, a second image region, of the first image, in which the second line is superimposed includes the overlapping portion, the processor detects an increase or decrease in a number of a plurality of specific objects included in the rear-view image, and when the number of the plurality of specific objects detected by the processor increases from a first number equal to or greater than 1 to a second number greater than the first number, the processor generates a third image in which the auxiliary lines are not superimposed or are superimposed in a semi-transparent state on the rear-view image.

2. The image generation apparatus according to claim 1, wherein when the rear-view image includes the overlapping portion, the processor generates the first image in which at least one of the auxiliary lines is not superimposed only at the overlapping portion or is superimposed in a semi-transparent state only at the overlapping portion.

3. The image generation apparatus according to claim 1, wherein, when the number of the plurality of specific objects detected by the processor decreases from a third number equal to or greater than 2 to a fourth number equal to or greater than 1 but less than the third number, the processor generates the first image in which the first line is superimposed and the second line is not superimposed or is superimposed in a semi-transparent state on the rear-view image.

4. The image generation apparatus according to claim 1, wherein, when the rear-view image includes the overlapping portion, the processor generates the first image in which at least one of the auxiliary lines is superimposed such that transparency of the at least one of the auxiliary lines decreases with increasing distance from the overlapping portion.

5. The image generation apparatus according to claim 4, wherein, the auxiliary lines include a third line, a fourth line and a fifth line, when a third image region in which the third line is superimposed includes the overlapping portion, neither a fourth image region in which the fourth line is superimposed nor a fifth image region in which the fifth line is superimposed includes the overlapping portion, and the fifth line is farther apart from the overlapping portion than the fourth line, the processor generates the first image in which at least one of the auxiliary lines is superimposed such that transparency of the fourth line is lower than transparency of the third line and transparency of the fifth line is lower than transparency of the fourth line.

6. The image generation apparatus according to claim 1, wherein, when the rear-view image includes the overlapping portion, the processor generates the first image in which at least one of the auxiliary lines is not superimposed or is superimposed in a semi-transparent state on the rear-view image.

7. A camera, comprising:

an imager that captures the rear-view image of the rear view from the vehicle; and the image generation apparatus according to claim 1.

8. A vehicle, comprising:

the camera according to claim 7.

9. A display system, comprising:

an imager that captures the rear-view image of the rear view from the vehicle;

the image generation apparatus according to claim 1; and a display that displays images generated by the image generation apparatus.

10. A vehicle, comprising:

the display system according to claim 9.

* * * * *